United States Patent [19]

Burns et al.

[11] 4,341,649
[45] Jul. 27, 1982

[54] ENERGY STORAGE MEDIUM AND METHOD

[75] Inventors: Edward J. Burns; Geoffrey T. White, both of Omaha, Nebr.

[73] Assignee: InterNorth, Inc., Omaha, Nebr.

[21] Appl. No.: 243,760

[22] Filed: Mar. 16, 1981

[51] Int. Cl.³ .............................................. C09K 5/06
[52] U.S. Cl. ........................................ 252/70; 165/2; 165/10
[58] Field of Search ................. 252/70; 126/400, 900; 165/10 A, 2, 104.17, 104.21

[56] References Cited

U.S. PATENT DOCUMENTS

| | | | |
|---|---|---|---|
| 4,111,189 | 9/1978 | Dizon | 126/400 |
| 4,213,873 | 7/1980 | Church | 252/174.21 |
| 4,259,198 | 3/1981 | Kreibich | 252/70 |
| 4,276,205 | 6/1981 | Ferry | 252/528 |

OTHER PUBLICATIONS

Union Carbide, "Polyox Water-Soluble Resins", 21 Page Technical Bulletin, #F-40246-C, Jan. 1964.
European Pat. Appln. 0000099, Published 12-20-78, Inventors Rurik et al., 11 pp.

*Primary Examiner*—Dennis L. Albrecht
*Attorney, Agent, or Firm*—Donald F. Haas

[57] ABSTRACT

An energy storage medium that can be raised to a high energy state which is comprised of a gel of polyethylene oxide, water, and a salt which causes gelation of polyethylene oxide and water at or below about 90° C., and a method for storing energy with the medium.

4 Claims, 2 Drawing Figures

ENERGY STORAGE MEDIUM AND METHOD

BACKGROUND OF THE INVENTION

The present invention relates to energy or heat storage media having high heat capacity which render them potentially useful to systems with facilities for the storage of energy or heat along with requisite heat transfer equipment.

Heat storage reservoirs are provided in cases where the amount of heat supply and heat demand differ from each other within given time periods. In many instances, the heat energy is available for a short period of time, while the heat consumption is more or less continuous. The use of solar energy for heating and for industrial processes is an example of this situation. Time unsteady industrial processes would be another.

Many different energy storage media have been used in the past. Stones, rocks, concrete blocks, bricks, gravel, and the like are relatively inexpensive but have the disadvantage of a very low heat capacity. Water is one of the most commonly used media. It has a reasonably high heat capacity and good heat transfer properties. The difficulty with water is that an enormous volume of it is needed to store a reasonable amount of heat.

Metal salt hydrates or the eutectic mixture of such hydrates with other hydrates or with ion-generating compounds are also suitable as energy storage media. Examples of such energy storage substances are sodium thiosulfate or sodium phosphate when the storage media are to be used for heating purposes. Examples of storage media used for cooling purposes are sodium sulphate mixed with sodium chloride or calcium chloride and water. Crystallizing solutions have discontinuities in their cooling curves as a consequence of the change in phase from liquid to solid. Usually, during the change in phase large amounts of energy are absorbed or released and usually this phase transition occurs over a relatively narrow temperature range. Thus, the storage of energy must also take place in a narrow temperature range, usually from 25° to 50° C. In addition, salts present severe heat transfer problems with resultant low thermodynamic efficiency in the overall storage systems in which they are used. Finally, these salts suffer greatly from cyclical losses due to stratification.

U.S. Pat. No. 4,153,105, Reversible Latent Heat Storage Method and Reversible Latent Heat Accumulator by Johann Schroder, issued May 8, 1979, discloses the use of aqueous solutions of potassium fluoride and sodium sulphate hydrate as heat storage media. In the description of prior art in column 1 of the patent, salt hydrates are disclosed which include nucleating materials added which do not dissolve in the medium but which substantially increase the number of nuclei formed and also include the addition of an organic (for example, gelatine) or inorganic (for example, waterglass) colloidal carrier material which assists in finally dispersing the nucleating agents throughout the heat storage medium by solidifying the heat storage medium in the form of a gel. The patent goes on to say that gels of this kind age comparatively quickly and their thermal conductivity is very low. The gels which are utilized in the present invention have a long life and their thermal conductivity is relatively high.

SUMMARY OF THE INVENTION

This invention relates to an energy storage medium which can be raised to a high energy stage which is comprised of a solution of polyethylene oxide and a salt in water which forms a gel upon heating. Typical salts which may be useful in this invention are sodium chloride, potassium chloride, sodium acetate, potassium fluoride, potassium hydroxide, lithium sulphate, zinc sulphate, magnesium sulphate, potassium sulphate, sodium silicate, potassium carbonate, sodium carbonate, and trisodium phosphate, among others. Any salt which will cause gelling of polyethylene oxide in water at or below about 90° C. can be used in this invention.

Another aspect of this invention is a method for using the above energy storage medium. This method comprises heating a solution of polyethylene oxide, water, and one of the salts described above to a temperature at or below about 90° C., thereby forming a gel at a high energy state. The energy (heat) stored by gelation can be released by cooling the mixture. This energy can be used in any number of applications. A major advantage of the medium of this invention is that it can be used repeatedly without suffering degradation whereas salt hydrates suffer greatly from cyclical losses due to stratification.

DETAILED DESCRIPTION OF THE INVENTION

An acceptable and functional energy storage medium must have the characteristics listed below. The energy storage medium of the present invention possesses these characteristics:

(a) A high energy storage capacity as evidenced by a high specific heat.

(b) A high specific heat over a broad temperature range.

(c) High thermal conductivity so that it can absorb heat rapidly.

(d) Low viscosity.

(e) Low corrosivity.

(f) Low vapor pressure.

(g) Moderate to high density.

(h) Low freezing point and high boiling point.

(i) Lack of degradation at the operating conditions under which it is utilized.

Figure 2:
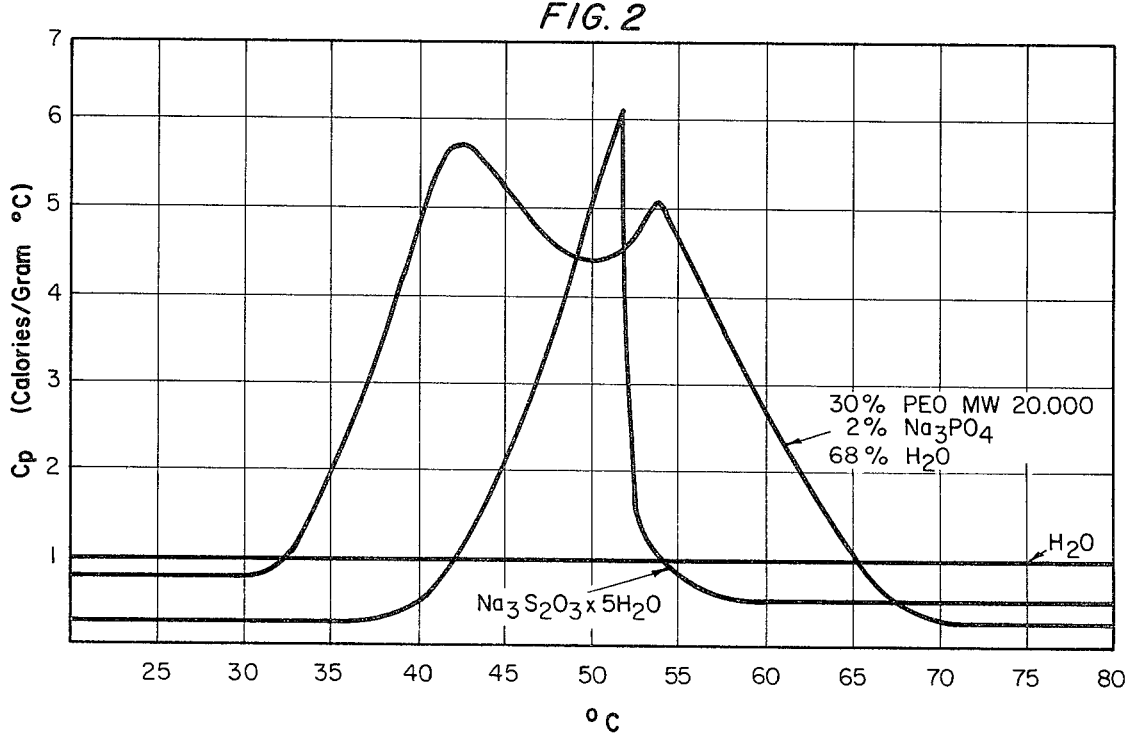
FIG. 2 is a plot of the specific heat versus temperature. It compares the overall heat capacity of the energy storage medium of the present invention versus that of two prior art energy storage media.

I have found that an organic or inorganic salt can be added to an aqueous solution of polyethylene oxide to form a superior energy storage medium that can be raised to a high energy state. When a salt such as trisodium phosphate is added to an aqueous solution of polyethylene oxide and the solution is heated to a temperature at or below 90° C., the solution forms a gel. The energy which was necessary to create the gel can be released by cooling the medium. The temperature range over which gelling occurs is much broader than the usable range for any other phase change energy storage media. Because of this and the fact that the specific heat of the medium remains high over the range, the overall energy state of the energy storage medium of the present invention, as evidenced by its heat capacity, is very high. Referring to FIG. 2, the heat capacity is the area under the curve of the plot of specific heat versus temperature. It can be seen that the area under the polyethylene oxide-trisodium phosphate curve is much greater than the areas under the water and sodium sulphate hydrate curves. Obviously then, the polyethylene oxide-trisodium phosphate gel is a much better heat storage medium than the other two known heat storage media.

As stated above, thermal conductivity is an important characteristic of a good energy storage medium. The thermal conductivity of the medium of the present invention is relatively high as indicated by a measurement of the thermal conductivity of one of the possible formulations. In this case, the thermal conductivity of a solution of 10 percent polyethylene oxide with a molecular weight of 20,000, one percent of trisodium phosphate, and 89 percent of water was determined to lie between 0.0005 calories per centimeter-seconds-degrees centigrade, the thermal conductivity of methanol, and 0.0015 calories per centimeter-seconds-degrees centigrade, the thermal conductivity of water.

The energy stored in the gel of the present invention can be removed from the gel by exposing it to a suitable temperature gradient. As the gel cools because of the transfer of heat energy via the temperature gradient, there is a phase transition in the gel from solid to liquid which releases the stored energy which is then transferred to whatever medium is causing the temperature gradient. The means for establishing temperature gradients are well-known. This cycle can be repeated many times without the medium of the present invention suffering from degradation or stratification. Several examples are provided here. First, the gel of this invention could be contained in a large storage tank of conventional design and in which is placed a heat exchanger. Preferably, this exchanger would have a high surface area (high effectiveness) on the gel side with conventional channels for the heat exchange fluid (such as water or water/glycol mixture) on the other. The so-called 'extended surface' heat exchanger is an example of such a configuration. Another method would be to encapsulate the gel in numerous relatively small containers which are suitably sealed from the environment. The heat transfer medium such as water or air would then be circulated past the exterior surfaces of these containers in a suitable fluid-tight chamber.

There are many examples of how such a storage facility could be used and two examples are provided here. First, the gel media of this invention could obviously be used in a solar-thermal facility. In the winter months, the excess solar heat collected during the day could be stored in the gel and released in the evening hours after facility heating. Another example would be the use of this gel to store low grade process waste heat during daytime operation to be released at night for facility heating.

Any salt which will cause polyethylene oxide to gel in water at or below 90° C. can be used in the energy storage medium of the present invention. If a salt will only cause a gelling above 90° C., it generally is not acceptable because the temperature will be too close to the boiling point of the solution resulting in a change in chemical composition and/or overpressuring of the system.

Figure 1:
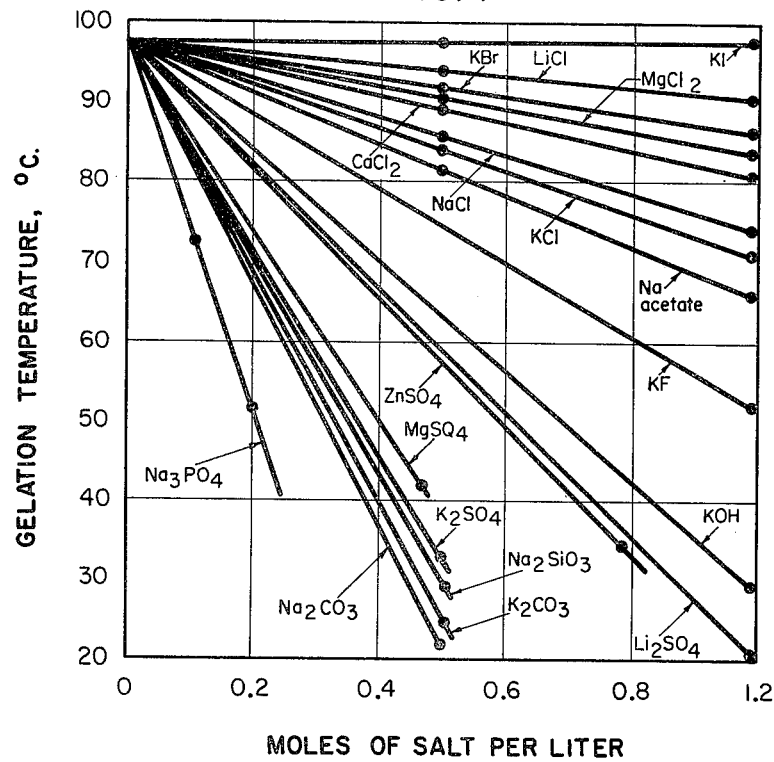
FIG. 1 is a plot of the gelation temperature versus the concentration of the salt in a solution of polyethylene oxide and water for various salts.

FIG. 1 shows the gelation temperature for various concentrations of various salts in a 0.5 percent by weight aqueous solution of polyethylene oxide. This graph shows that trisodium phosphate is the preferred salt for use in the present invention since it promotes gelation at lower temperatures and lower salt concentrations. Other salts which are effective in the present invention include sodium chloride, potassium chloride, sodium acetate, potassium fluoride, potassium hydroxide, lithium sulphate, zinc sulphate, magnesium sulphate, potassium sulphate, sodium silicate, potassium carbonate, and sodium carbonate.

Polyethylene oxide is a crystalline, thermoplastic, water-soluble polymer with the general formula $HOCH_2(CH_2OCH_2)_nCH_2OH$ or $H(OCH_2CH_2)_nOH$. The end groups are said to be hydroxyl groups only in the case of the lower molecular weight species. Unlike most polymer systems, polyethylene oxide is commercially available in an extraordinarily wide range of molecular weights from ethylene glycol, diethylene glycol, and so on, up to polymers that have molecular weights many times greater than a million. The lower molecular weight members of the series with n up to about 130 (molecular weight from about 200 to about 6000) are generally known as polyethylene glycols while the higher members (molecular weight greater than 6500 up to 100,000 to several million) are known as polyethylene oxide, polyoxyethylene, or polyoxirane. The preferred polyethylene oxide polymers for use in the present invention have a molecular weight of at least about 6500 and, theoretically, there is no maximum.

The higher (polyethylene oxide) and lower (polyethylene glycol) molecular weight members of this series differ sufficiently in properties as to form two classes. The lower members range from relatively viscous fluids to wax-like solids while the higher members are true thermoplastics capable of being formed into tough, molded shapes. The property differences of these two classes are due principally to large differences in molecular weight and the relatively greater importance, therefore, of the end groups in the low molecular weight class. The viscous fluids are generally unsuitable for use in this invention because they do not form gels.

The composition of the present invention is prepared by dissolving the proper amount of polyethylene oxide in a measured amount of water. This may be accomplished by any conventional method, but I have found that simply mixing the polyethylene oxide in warm water (30° C. to 70° C.) is sufficient to provide the desired composition. The addition of the salt may be accomplished by simply mixing the salt with the polyethylene oxide solution.

The following examples are meant only to illustrate the invention and not to limit in any way.

EXAMPLE 1

A solution of 120 grams of water, 1.5 grams of polyethylene oxide with a molecular weight 900,000, and 0.5 grams of trisodium phosphate was made by adding the polyethylene oxide and salt to water and stirring until they were dissolved. Gelation occurred below 90° C. The heat storage capacity of this solution was determined using a Differential Scanning Calorimeter. Over the temperature range of 27° C. to 92° C., the solution had a heat storage capacity of about 110 calories per gram, substantially greater than that of water. Because of its initial liquid state, this material is a good heat transfer material and requires substantial less volume or weight for the same storage capacity as water.

EXAMPLE 2

Three solutions were made according to the procedure of Example 1. The solutions each contained 100 grams of water and 30 grams of polyethylene oxide with a molecular weight range of 7000 to 9000. Three solutions had 0.5 grams, 1.0 gram, and 1.5 grams of trisodium phosphate, respectively. Gelation occurred below 90° C. All of the solutions had a heat capacity of about 65 calories per gram over a temperature range of 32° C. to 90° C., just slightly greater than that of water.

EXAMPLE 3

A solution of 100 grams of water, 30 grams of polyethylene oxide with a molecular weight range of 7000 to 9000, and 3.5 grams of trisodium phosphate was made according to the method of Example 1. The heat capacity was determined to be approximately 300 calories per gram over a temperature range of 32° C. to 92° C. The solution was cooled and showed a strong exothermic peak. The solution was then cycled through four additional heating and cooling cycles. In each heating, the solution went through a transition at about 55° C. Upon cooling, the transition occurred at 35° C. The heat capacity of this mixture between 32° C. and 60° C. is 62 calories per gram. The mixture was then cycled repeatedly for about 40 cycles over a four-day period. There was no deterioration or degradation of the solution.

EXAMPLE 4

In the following example, the properties of the solution of Example 3 were compared with the properties of three known energy storage media whose thermodynamic properties were determined by conventional thermodynamic techniques. A Differential Scanning Calorimeter was used. The following table shows the results of this experiment:

|  | Rocks | Water | Sodium Sulphate | PEO Soln |
|---|---|---|---|---|
| Usable Temp. Range (°C.) | Varies | 0–100 | 25–50 | 25–55 |
| Specific Heat Btu/Lb. | 0.2 | 1.0 | .55 | 1.9 |
| Heat of Phase |  |  |  |  |
| Transition Btu/Lb. | — | N.A. | 90 | 45 |
| Heat Capacity - Btu/Lb. (11° C. Range) | 4 | 20 | 101 | 85 |
| Heat Capacity - Btu/Lb. (22° C. Range) | 8 | 40 | 112 | 122 |
| Weight Need to Store $10^6$ Btu, Lb. | $25 \times 10^4$ | $5 \times 10^4$ | $1 \times 10^4$ | $8.2 \times 10^3$ |
| Volume Needed to Store $10^6$ Btu, Ft$^3$ | 2,150 | 1,000 | 125 | 150 |

The polyethylene oxide and trisodium phosphate solution has the highest specific heat and it has a higher heat capacity in both temperature ranges than rocks or water. It also has a higher heat capacity than sodium sulphate over the broad temperature range. Furthermore, it requires the least amount of weight to store 1,000,000 Btu's per pound of energy.

EXAMPLE 5

The specific heats of water, a solution of polyethylene oxide with a molecular weight of 100,000 in water, a solution of the same polyethylene oxide and trisodium phosphate in water with and without gelation, and sodium sulphate were determined over a temperature range of 35° C. to 81° C. by using a Differential Scanning Calorimeter. The following table shows the results of this experiment:

| Temp(°C.) | $H_2O$ | PEO Soln | No Gelation PEO & $Na_3PO_4$ | Gelation PEO & $Na_3PO_4$ | $Na_3S_2O_3 \times 5H_2O$ |
|---|---|---|---|---|---|
| 35 | 1.0 | .93 | — | 0.58 | — |
| 37 | 1.0 | .77 | 1.02 | 0.57 | — |
| 39 | 1.0 | .91 | — | 0.71 | — |
| 41 | 1.0 | .63 | .73 | 3.04 | .6 |
| 43 | 1.0 | .76 | — | 4.07 | 1.06 |
| 45 | 1.0 | .73 | — | 4.20 | 2.06 |
| 47 | 1.0 | .71 | .72 | 4.20 | 3.08 |
| 49 | 1.0 | .59 | — | 5.00 | 4.5 |
| 51 | 1.0 | .57 | — | 4.65 | 5.6 |
| 53 | 1.0 | .61 | .75 | 4.30 | 1.0 |
| 55 | 1.0 | .51 | — | 3.30 | .7 |
| 57 | 1.0 | .36 | .63 | 3.30 | .6 |
| 59 | 1.0 | .35 | — | 4.51 | .55 |
| 61 | 1.0 | .32 | — | 5.46 | .5 |
| 63 | 1.0 | .19 | .47 | 5.75 | .5 |
| 65 | 1.0 | .30 | — | 5.71 | .5 |
| 67 | 1.0 | .27 | .42 | 5.07 | .4 |
| 69 | 1.0 | .32 | — | 5.44 | .5 |
| 71 | 1.0 | .28 | — | 4.79 | .4 |
| 73 | 1.0 | .34 | .50 | 4.37 | — |
| 75 | 1.0 | .20 | — | 4.00 | — |
| 77 | 1.0 | .30 | .68 | 2.90 | — |
| 79 | 1.0 | .38 | — | 1.09 | — |
| 81 | 1.0 | .33 | — | 0.45 | — |

It can be seen that the solution and gel in accordance with the present invention has the highest heat capacity over the broadest temperature range of any of the five energy storage media compared in the table. Furthermore, it has a much higher specific heat than polyethylene oxide and water alone. The specific heats for trisodium phosphate were unavailable, but the *International Critical Tables of Numerical Data, Physics, Chemistry and Technology, Volume V*, published by the McGraw-Hill Book Company of New York in 1929 gives the specific heats over a temperature range of 24° C. to 55° C. for sodium phosphite, sodium dihydrogen phosphate, sodium monohydrogen phosphate, and sodium pyrophosphate on page 124. The specific heats were given for various concentrations of these materials in water and they ranged from 0.85 to 0.98. Thus, it can be seen that there is a synergistic effect by the use of trisodium phosphate and polyethylene oxide to form a gel.

We claim:

1. A method of storing energy which comprises heating a solution of polyethylene oxide, water, and a salt which causes gelation of polyethylene oxide and water to a temperature at or below about 90° C., thereby forming a gel with a high energy state.

2. The method of claim 1 wherein the salt is selected from the group consisting of sodium chloride, potassium chloride, sodium acetate, potassium fluoride, potassium hydroxide, lithium sulphate, zinc sulphate, magnesium sulphate, potassium sulphate, sodium silicate, potassium carbonate, sodium carbonate, and trisodium carbonate.

3. A method of energy storage and transfer which comprises the steps of:

(a) contacting a solution of polyethylene oxide, water, and a salt which causes gelation of polyethylene oxide in water with a warm medium such that the temperature of the solution is raised to at or below about 90° C., thereby forming a gel with a high energy state, (b) storing the energy transferred from the warm medium in the gel for a period of time, and (c) contacting the gel with a cool medium whereby the gel goes through a phase change to liquid form and the energy stored therein is transferred to the cool medium.

4. The method of claim 3 wherein the salt is selected from the group consisting of sodium chloride, potassium chloride, sodium acetate, potassium fluoride, potassium hydroxide, lithium sulphate, zinc sulphate, magnesium sulphate, potassium sulphate, sodium silicate, potassium carbonate, sodium carbonate, and trisodium phosphate.

* * * * *